United States Patent [19]
Chelminski

[11] 4,271,924
[45] Jun. 9, 1981

[54] AIRGUN APPARATUS PROVIDING HIGH STRENGTH AND HIGH PRESSURE CAPABILITIES

[75] Inventor: Stephen V. Chelminski, West Redding, Conn.

[73] Assignee: Bolt Associates, Inc., Norwalk, Conn.

[21] Appl. No.: 955,184

[22] Filed: Oct. 27, 1978

[51] Int. Cl.³ .............................................. G01V 1/38
[52] U.S. Cl. ..................................... 181/120; 367/144
[58] Field of Search ....................... 181/120, 118, 119; 367/144

[56] References Cited

U.S. PATENT DOCUMENTS

| | | | |
|---|---|---|---|
| 3,416,621 | 12/1968 | Balashkard et al. | 181/118 |
| 3,638,752 | 2/1972 | Wakefield | 181/120 |
| 3,653,460 | 4/1972 | Chelminski | 181/120 |
| 3,997,021 | 12/1976 | Chelminski | 181/119 |
| 4,051,918 | 10/1977 | Rogers | 181/119 |
| 4,098,369 | 7/1978 | Altschuler et al. | 181/120 |
| 4,114,723 | 9/1978 | Paitson et al. | 181/120 |
| 4,164,264 | 8/1979 | Fair | 181/119 |

FOREIGN PATENT DOCUMENTS

| 7806108 | 8/1978 | Netherlands | 181/120 |
|---|---|---|---|

*Primary Examiner*—Howard A. Birmiel
*Attorney, Agent, or Firm*—Parmelee, Johnson, Bollinger & Bramblett

[57] ABSTRACT

Airgun apparatus are disclosed providing high strength, high pressure and large volume capabilities. An integral high-strength cylindrical housing extends for the full length of the airgun and gives a sleek overall cylindrical configuration. The components of the airgun advantageously are assembled within this cylindrical housing in two groups by sliding them in through the upper or lower end, respectively; moreover, either of the groups of components can be removed independently of the other. The components are pressed firmly together in place within the cylindrical housing by a strong screw-jack type of holding action, and tightening and locking apparatus is included on the airgun itself for enabling the mechanic to tighten and lock the holding means with enormous mechanical advantage. Even though held together under great axial compression, the components are maintained in predetermined accurately registered relationship with respect to the discharge ports in the cylindrical housing and with respect to each other by first and second internal shoulders located within the cylindrical housing near the discharge ports. A reliable, rugged firing seal engages the periphery of the firing piston when it is in its closed position. This firing seal is captivated in position and does not involve any associated springs or movable members, and gas pressure is applied in a manner to increase the tightness of the sealing action. This peripheral firing seal enables the firing chamber to have a wide-mouth so that discharged gas can flow out without restriction. The rebound action of the shuttle near the top of its firing stroke is advantageously controlled and damped for reducing stresses, and the rebound control and damping effect can be adjusted.

20 Claims, 5 Drawing Figures

AIRGUN APPARATUS PROVIDING HIGH STRENGTH AND HIGH PRESSURE CAPABILITIES

FIELD OF THE INVENTION

The present invention is in the field of pressurized gas discharging apparatus for releasing a charge of pressurized gas with explosive-like suddenness. Such pressurized gas discharging apparatus is often called an "airgun". Airguns are particularly useful as seismic energy sources for seismic surveying and can be used for other purposes where powerful impulses are employed.

BACKGROUND OF THE INVENTION

As background for understanding the present invention, it is noted that airguns have become recognized and accepted by seismic survey contractors and resource companies as being very useful.

In view of the importance to natural resource companies and to the nations of the world in obtaining seismic data from as deep within the earth as possible, and in view of the great costs involved in carrying out seismic surveying campaigns, there is continuing interest in the possibility of more powerful and even more reliable airguns. Moreover, very powerful and reliable airguns are desirable for other uses where intensely strong impulses may be employed.

In the description hereafter of the preferred embodiment of the airgun now conceived as being the best mode for placing this invention into practice, it is assumed that the reader has a familiarity with prior art airguns. If background information on airguns is desired, reference may be made to U.S. Pat. Nos. 3,249,177; 3,379,273; 3,310,128; 3,653,460; 3,808,822; 3,997,021; and 4,038,630.

As used herein, the term "pressurized gas" is intended to include any pressurized gas or pressurized mixture of gases which can be used in an airgun, for example such as compressed air, compressed carbon dioxide, compressed nitrogen, pressurized steam, and the like. In most cases, it is easier and cheaper to use compressed air, supplied from a mobile compressor or from portable tanks, and air is usually the preferred pressurized gas to be employed. However, in certain cases, for example, if the environment is suspected to contain combustible vapors or flammable gas or agents unduly reactive with air, then it may be desirable to use a non-combustion-supporting gas, such as carbon dioxide or nitrogen. Also "pressurized" is intended to mean at an elevated pressure substantially above atmospheric pressure, for example, such as in the preferred range from 500 pounds per square inch (p.s.i.) up to 6,000 p.s.i., although higher or lower pressure of the pressurized gas may occasionally be used.

The pressurized gas discharging apparatus described in the aforementioned patents have been referred to as airguns. An airgun is said to be "fired" when the pressurized air or other gas it contains is caused to be abruptly released and discharged with explosive-like suddenness into the surrounding environment.

The airguns known prior to the present invention generally include, as operative components, firing chamber means for holding gas under high pressure, a release means which can be actuated to abruptly release the pressurized gas through discharge ports, means for supplying gas under high pressure to the firing chamber means, and control means for causing the release means to be actuated to release the pressurized gas. The release means generally comprises a shuttle including a first (or releasing) piston positioned near the firing chamber for retaining the pressurized gas therein and a second (or operating) piston positioned in an operating cylinder or control chamber in which pressurized gas acts against the second piston to maintain it in "closed" position until it is to be released. The shuttle pistons are interconnected by a shaft which is reciprocally positioned between the operating cylinder and the firing chamber and is hollow for permitting a supply of pressurized gas to flow first to the operating cylinder and thence to the firing chamber.

The airguns may be self-firing by appropriate relative sizing of the exposed surface areas of the shuttle pistons or may be fired by operation of a solenoid valve for controlling flow of pressurized gas through various firing passages to cause the shuttle to be abruptly operated. A suitable solenoid valve means is described in U.S. Pat. No. 3,588,039. Both the self-firing and the solenoid-valve-controlled firing modes of airgun operation are described in my U.S. Pat. No. 3,379,273.

In such prior art airguns, the releasing piston of the shuttle in its closed position engages against an annular sealing assembly including a ring-shaped sealing member which is axially movable and is spring-biased to move upwardly toward the lower face of the releasing piston. This annular sealing assembly, including its spring means, spring retainer, the movable annular sealing member for engaging the lower face of the releasing piston and its associated slidable seal, is relatively complex and bulky. Moreover, this bulky annular sealing assembly surrounds the upper end of the firing chamber, thereby causing a restricted throat region above the firing chamber. Consequently, the pressurized gas being discharged from the firing chamber must pass through this restricted throat region, which tends to inhibit the desired rapidity of the gas outflow from the firing chamber, thereby limiting the powerfulness of the impulse.

The assembly of the main body portions of such prior art airguns has generally been accomplished by utilizing clamp rings clasping together flanged ends on the respective body portions. Such clamp rings produce an irregular exterior configuration for the airgun as a whole, and they tend to limit the overall strength and pressure capability of the airgun. Moreover, the clamp rings, being in an exposed exterior position on the airgun are subject to damage in the severe environmental conditions of being handled on the deck of a rolling and pitching vessel in a rough sea.

SUMMARY OF ADVANTAGES OF ILLUSTRATIVE EMBODIMENT OF THE INVENTION

Among the advantages of the airgun shown herein as an embodiment of the invention is its sleek overall cylindrical configuration. An integral high-strength cylindrical housing extends for the full length of the airgun.

The high strength and size of this airgun enables it to be constructed with relatively large firing chamber volumes, for example up to 2,000 cubic inches or more which are capable of holding pressurized gas at high pressure of 4,000 p.s.i. to 6,000 p.s.i., thereby providing a very powerful discharge.

The components of the airgun advantageously are assembled within this cylindrical housing in two groups by sliding them in through the upper or lower end, respectively, of the housing. Moreover, either of the two groups of components can be removed independently of the other.

The components are pressed firmly together in place within the cylindrical housing by a strong screw-jack type of holding action. In addition, tightening and locking apparatus is included with the screw-jack holding means on the airgun itself for enabling the mechanic to tighten and lock the holding means with enormous mechanical advantage.

Even though the components are securely held together under great axial compression, they are advantageously maintained in predetermined accurately registered relationship with respect to the discharge ports in the cylindrical housing and with respect to each other by first and second internal shoulders located within the cylindrical housing near the discharge ports.

A reliable, rugged firing seal is provided for engaging the periphery of the releasing piston when it is in its closed position. This firing seal is captivated in position and does not involve any associated springs or movable members. It has a trapezoidal configuration as seen in cross section, and gas pressure is applied in a manner to increase the tightness of the sealing action. This peripheral firing seal advantageously enables the firing chamber to have a wide-open mouth so that the discharged gas can flow out of the firing chamber without restriction.

The rebound action of the shuttle near the top of its firing stroke is advantageously controlled and damped for reducing the stresses in the shuttle, and rebound the control and damping effect can be adjusted.

BRIEF DESCRIPTION OF THE DRAWINGS

The various features, aspects and advantages of the preferred embodiment disclosed herein will become more fully understood and appreciated by a consideration of the following detailed description in conjunction with the accompanying drawings, in which.

DETAILED DESCRIPTION

Figures 1, 2:
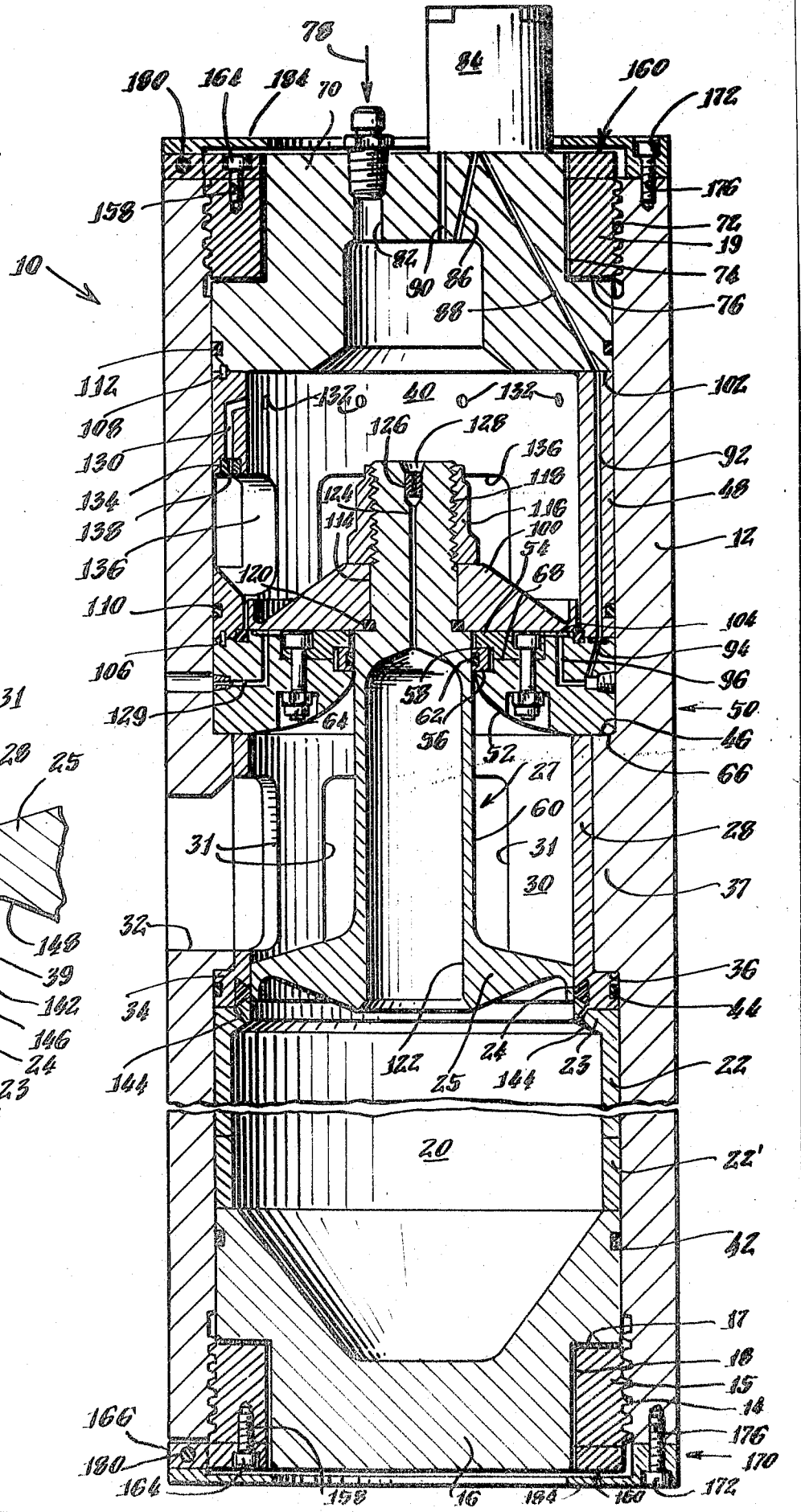
FIG. 1 is an axial sectional view of a high strength, high pressure cylindrical airgun embodying the present invention.
FIG. 2 is an enlarged view of a portion of FIG. 1 for showing more clearly the firing seal and its operation with neighboring components.

Referring to FIG. 1, the pressurized gas discharging apparatus 10, which may be referred to as an airgun, includes an elongated one-piece, strong cylindrical housing 12 forming the external casing of the airgun. At its lower end, the cylindrical housing 12 is internally threaded at 14 with a strong, screw-jack type of thread. A large ring nut 15 is screwed into the threads 14, and it holds a bottom end closure 16 in the form of a generally cup-shaped end cap with a washer 17 between them. The end cap 16 has an external annular rabbet 18 which provides clearance for the nut 15. The advantageous manner in which this large ring nut 15 is screwed up tightly and locked in place will be described in detail further below.

It is to be noted that the components of the airgun fit snugly within the housing 12, and they are in stacked relationship in two independently removable groups. The two respective groups of components are held together under relatively high compression by the lower large ring nut 15 and by a similar large ring nut 19 at the upper end of the airgun.

The space above the end cap 16 is the firing chamber 20 capable of holding a large charge of pressurized gas at relatively high pressure, for example, up to 4,000 p.s.i. or more. This chamber 20 is surrounded by a sleeve 22 having an inwardly extending and upwardly sloping lip surface 23 at its upper end for holding a ring-shaped firing seal 24. This firing seal 24 engages the periphery of a piston element 25 of a movable shuttle 27, and it is of tough, durable, elastic, stiffly-flexible material, for example, of high strength polyurethane. It is to be noted that this seal 24 is rugged and reliable. The peripheral seal 24 does not involve any spring-biased movable holders such as are used in the face-seal-type of apparatus of the prior art. The advantageous operation of this firing seal 24 will be explained in detail further below in connection with FIG. 2.

The volume of the firing chamber 20 can be reduced or enlarged, if desired, by re-positioning the end cap 16, so that it is located higher or lower relative to the housing 12, as will be explained further below. The sleeve 22 rests upon an upwardly tapered rim 26 of the end cap 16. There is a second sleeve 28 defining a release cylinder 30 and resting upon the first sleeve 22. Within this release cylinder 30 moves the firing piston element 25 of the shuttle for releasing the charge of pressurized gas from the chamber 20. This release cylinder sleeve 28 contains a plurality of discharge ports 31 aligned with corresponding discharge ports 32 in the casing 12, which has a thickened wall portion 37 in the vicinity of these discharge ports 32.

The second sleeve 28 may be called the release cylinder sleeve. At its lower end, there is an outwardly extending annular flange portion 34 which seats up against an internal shoulder 36 formed by the thickened wall portion 37 of the cylindrical housing 12. For holding the firing seal 25 (FIG. 2), the lower end of the sleeve 28 has an undercut groove 38 forming an inwardly extending and downwardly sloping lip surface 39.

It is to be noted that the release cylinder sleeve 28, the firing chamber sleeve 22, the firing seal 24, and the bottom end cap 16 are all held in place by the tightly screwed ring nut 15 and can be removed by removal of this ring nut. These two sleeves 28, 22 and the firing seal 24 are accurately positioned in predetermined registered relationship within the housing 12 by virtue of the external flange 34 seating up against the internal shoulder 36, which serves as a first stop surface in predetermined axial position with respect to the discharge ports 31, 32. Moreover, advantageously, these lower components: sleeves 28, 22, firing seal 24, and bottom end caps 16 can be removed as a group independent of, and without disturbing, the other airgun components, because the thickened wall portion 37 serves to support all of the other components which are located above the release cylinder 30. Thus, servicing of this airgun is facilitated. These lower components are conveniently removed as a first group by removing the lower ring nut 15 without disturbing upper components; whereas, the upper components, as will be described, are removed as a second group by removing the upper ring nut 19, without disturbing the lower components.

An O-ring 42 in a groove provides a seal between the bottom end cap 16 and the cylindrical housing 12. Another similar O-ring 44 in a groove in the flange 34 makes a seal with the housing 12 at a location close below the internal shoulder 36.

An operating cylinder 40 is defined by the second group of components held between the upper ring nut 19 and a second internal shoulder 46 formed by the upper end of the thickened wall portion 37. The operating cylinder 40 is lined with an operating cylinder sleeve 48. Positioned between the lower end of this sleeve 48 and the internal shoulder 46 are removable partition means 50. These removable partition means include a lower shaft gland annular support 52 and an upper shaft gland annular retainer 54. The support 52 and retainer 54 hold between them a shaft gland 56 fitting into an annular socket 58. This annular socket 58 if formed by aligned annular rabbets in the inner lip portions of both members 52 and 54 where they encircle the enlarged hollow shank portion 60 of the shuttle 27. An O-ring 62 of tough, durable stiffly flexible material, for example, such as high strength polyurethane, is held in a groove in the gland 56 and provides a seal with the shank 60 of the shuttle 27 which reciprocates axially at high speed during firing and re-closing of the airgun 10.

A plurality of bolts 64 arranged in a circle removably secure the retainer 54 and support 52 together. The heads and nuts of the respective bolts 64 are countersunk in sockets in the respective members 52 and 54. Thus, the removable partition means 50 includes support 52, retainer 54, gland 56, O-ring 62 and bolts 64. These bolts enable the partition means 50 to be pre-assembled as a subassembly before being inserted into the cylindrical housing 12 together with the shuttle 27. It is noted that the gland support 52 is of larger outside diameter than the release cylinder sleeve 28. Thus, the outwardly projecting portion of the support 52 forms an external shoulder 66 seating down on the internal shoulder 46. The upper retainer 54 is generally ring-shaped and fits down into an annular groove 68 in the top of the support 52.

The removable partition means 50 form a partition encircling the shuttle shank 60 between the operating cylinder 40 and the release cylinder 30.

The internal shoulder 46 serves as a second stop surface in predetermined axial position with respect to the discharge ports 31, 32, and also with respect to the other internal shoulder 36. Consequently, the removable partition means 50 is accurately positioned within the housing 20 in predetermined registered relationship with respect to the discharge ports and firing seal 24.

In order to close the upper end of the airgun 10, there is an upper closure 70 in the form of an inverted cup-shaped cap which is held by the ring-shaped nut 19. This nut 19 is screwed down tightly into the strong screw-jack type of threads 72 machined into the inner surface of the upper end of the cylindrical housing 12. The threads 72 are identical with the threads 14 at the lower end of the housing 12. The upper end cap 70 has an annular rabbet 74 providing clearance for the ring nut 19, and a washer 76 is between them. The way in which the ring nut 19 is advantageously screwed down very tightly in the threads 72 is similar to that for the lower ring nut 15 and will be explained in detail further below.

The pressurized gas 78 for charging the airgun 10 is fed in through a fitting 80 screwed into a socket in the upper end closure 70 communicating with a supply passage 82 leading into the operating cylinder 40. A solenoid-controlled valve 84 is rigidly secured onto the end closure 70 by a plurality of machine screws (not shown).

When it is desired to fire the airgun 10, the solenoid valve 84 is momentarily energized by an electrical signal thereby providing communication between respective passages 86 and 88 drilled in the upper end closure 70.

In order to monitor the firing of this airgun, there may be provided a monitoring passageway 90 in the upper end closure communicating with pressure transducer means (not shown) advantageously located within the solenoid valve 84. This method and apparatus for monitoring the firing of the airgun are disclosed in detail and claimed in my copending application Ser. No. 917,794, filed June 22, 1978. The firing passage 88 communicates with a firing passage 92 extending longitudinally within the wall of the operating cylinder sleeve 48. The lower end of this latter passageway 92 communicates with passages 94 and 96 drilled in the gland support 52 leading to an annular groove 98 positioned below an operating piston element 100 of the shuttle 27.

Thus, when the solenoid valve 84 is opened by an electrical signal pulse, the pressurized gas in the operating cylinder 40 can flow in sequence through the firing passages 86, 88, 92, 94, 96 into the annular groove 98 for causing the airgun to fire by effectively releasing the holding action of the pressurized gas on the operating piston element 100.

For providing a seal for the intercommunicating firing passages 88 and 92, there is a small O-ring 102 seated in a groove in the top of the operating cylinder sleeve 48 encircling the upper end of the passage 92. Similarly, an O-ring 104 is seated in a groove in the top of the gland support 52 encircling the upper end of the passage 94 for sealing the two passages 92 and 94.

During assembly of the airgun 10, in order to align the passage 92 in the sleeve 48 with the passage 94, there is an alignment dowel 106 projecting up from the support 52 and adapted to engage in a mating socket in the lower end of the sleeve 48. Similarly, to align the passage 88 with the passage 92, there is an alignment dowel 108 projecting up from the upper end of the sleeve 48 engageable in a mating recess in the upper end closure 70. O-rings 110 and 112 provide seals between the cylindrical housing 12 and the sleeve 48 and upper end closure 70.

Consequently, all of the components above the internal shoulder 46 can be removed from the cylindrical housing 12 by removing the ring nut 19.

As explained above, the removable partition means 50 can be pre-assembled as a sub-assembly before insertion into the housing 12. Also, the shuttle 27 is assembled with the partition means 50 before insertion into the airgun. This assembly of the shuttle 27 is accomplished by inserting its shank 60 through the gland seal 56, 62 and then placing the operating piston element 100 onto the reduced diameter upper portion 114 of the shank 60. A self-locking type of nut 116 is screwed down onto the threaded region 118 of the shank, and O-ring 120 forms a seal between the piston element 100 and the shank of the shuttle.

The shank 60 of the shuttle has a relatively large diameter for providing the desired rigidity for the shuttle as a whole. This shank is hollowed out along the major portion of its length, as shown at 122, for reducing the overall mass and weight of the shuttle.

During charging of the airgun, the air flows from the operating cylinder 40 down through an axial passage 124 in the shuttle shank into the hollow shank region 122 communicating with the firing chamber 20. A removable orifice element 126 screws into the upper end of the passage 124. This orifice element 126 can be removed and replaced by another for changing the effective size of the orifice 128 for regulating the rate at which the pressurized gas can recharge the firing chamber 20 after each firing of the airgun.

In order to aid in reclosing of the shuttle after each firing of the airgun, a bleed passage 129 containing an orifice element provides communication between ambient and the annular groove 98.

During the firing of the airgun, the shuttle 27 travels upwardly at a high rate of speed with the firing piston element 25 moving up fast in the release cylinder 30, thereby uncovering the discharge ports 31, 32 permitting pressurized gas in the firing chamber 20 to discharge with explosive-like suddenness through these ports. Simultaneously, the operating piston element 100 travels upwardly within the operating cylinder 40, causing pressurized gas to become trapped between the upper end closure 70 and the top of the shuttle and thereby causing the shuttle to rebound downwardly toward its initial position.

A relatively violent acceleration occurs as the upwardly-travelling shuttle is reversed in direction by the trapped gas and is driven back down toward its initial position.

In order to control and to damp the rebound action of the shuttle, a plurality of rebound-control damping passages 130 are drilled in the wall of the operating cylinder sleeve 48. The upper ends of these control passages 130 communicate through ports 132 with the interior of the operating chamber 40 at an elevation therein near the upper limit of travel of the operating piston 100. The lower ends of these passages 130 communicate through removable orifice elements 134 with cut-out openings 136 located in the wall of the operating chamber sleeve 48. These orifice elements 134 are screwed into sockets at the lower ends of the rebound-control damping passages 130 and can be removed and replaced with other elements having larger or smaller orifices 138 for adjusting the rebound damping action.

In operation, as the piston element 100 travels upwardly past the cut-outs 136, the pressure of the gas in the operating chamber 40 above and below the rising piston 100 tends to equalize itself by flow through the relatively large cut-out regions 136. (Such cut-out openings 136 are known per se in the prior art.) Thereafter, as the piston 100 rises further above the top of these cut-outs 136, the gas becomes trapped in the upper portion of the operating cylinder 40. Some of this trapped gas is permitted to flow out through the ports 132 and down through the passages 130 and through orifices 138, thereby somewhat attenuating the increase in pressure of the trapped gas in cylinder 40 above the rising shuttle. Also, this flow of gas down through the passages 130 and orifices 138 dissipates energy, thereby moderating the rebound action.

After the piston 100 reverses direction and begins travelling downwardly in the operating chamber 40, the flow through the rebound control passages 130 becomes reversed, gas flows up through the orifices 138 and up passages 130 into the now enlarging volume in the chamber 40 above the descending shuttle. This upward flow of the gas through the orifices 138 and passages 130 enables the piston 100 to travel down below the top of the cut-outs 136, when the pressure can again equalize above and below the piston 100 for completing the reclosing stroke of the shuttle.

Consequently, the overall rebounding action of the shuttle is attenuated and moderated as compared to what would take place if the rebound control means 130, 132, 134, 138 were not present. Thus, the stresses on the shuttle 27 and its piston elements 25 and 100 and on its shank portions and on the nut 116 advantageously controlled and reduced.

Inviting attention to FIG. 2, the advantages of firing the seal arrangement will now be described. By virtue of the fact that this seal 24 is set into the wall between the firing chamber 20 and the release chamber 30, the opening at the top or mouth of the firing chamber 20 is effectively as large as the full diameter of the release cylinder 30. Consequently, the discharged gas can travel freely up from the firing chamber 20 into the release cylinder 30 and out through the discharge ports.

This wide-open mouth of the firing chamber 20 is quite different from the prior art airguns in which the firing seal with its associated moving parts and springs and spring holders causes a restricted throat to occur at the upper end of the firing chamber.

The firing seal 24, as seen in cross section, (Please see FIG. 2) has a trapezoidal shape, thereby providing two converging sloping surfaces engaging against and being captivated by the converging lip surfaces 23 and 39. The outer cylindrical surface 140 of the firing seal 124 is substantially larger in area than its inner cylindrical surface 142 which engages the periphery of the firing piston 25. This differential in area between the respective surfaces 140 and 142 is used to advantage for effecting a tight sealing action between the firing seal 24 and the piston element 25. A plurality of very small passages 144 are drilled in the lip region of the sleeve 22 for communicating with the outer surface 140 of the seal. These passages 144 permit the pressure of the gas being held in the firing chamber 20 by the piston 25 to press against the outer surface 140 of the firing seal. The pressure of the gas admitted through the passages 144 and pressing against the surface 140 urges the seal 24 inwardly and holds its sealing surface 142 tightly against the periphery of the piston 25 when it is in its closed position.

The periphery of the release piston 25 has a cylindrical rim portion 146 extending in an axial direction. This rim portion 146 advantageously increases the area of contact with the wall surface of the cylinder sleeve 28, while the tapered region 148 of the piston element 25 reduces its mass and effectively increases its ability to withstand sudden acceleration. There is a similar lip configuration on the operating piston 100.

Figure 4:
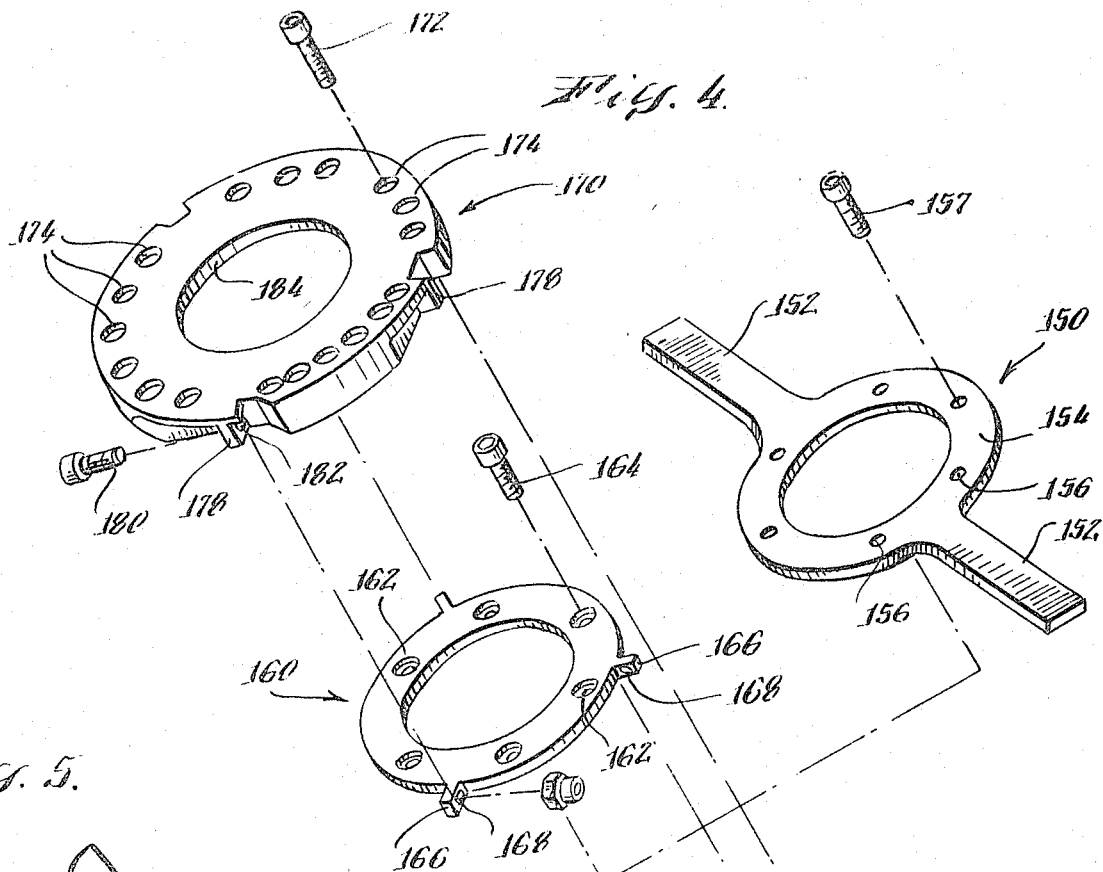
FIG. 4 is an exploded perspective view illustrating how each of the end closures is applied and tightened.

The way in which the ring nuts 15 and 19 are firmly screwed into position will now be explained. As shown in FIG. 4, a wrench 150 is provided having a pair of handles 152 with a central ring portion 154. This ring portion 154 has a plurality of bolt holes 156. This wrench is adapted to be attached to either of the ring nuts 15 or 19 by inserting a plurality of machine screws 157 through the holes 156 and into corresponding threaded sockets 158 in the axial end of the respective ring nut 15 or 19. Thus, with the leverage provided by the large radial handles 152, the mechanic can tightly screw the respective ring nut 15 or 19 into position. Then, the machine screws 157 are removed from the holes 156, and the wrench 150 is set aside.

Figure 5:
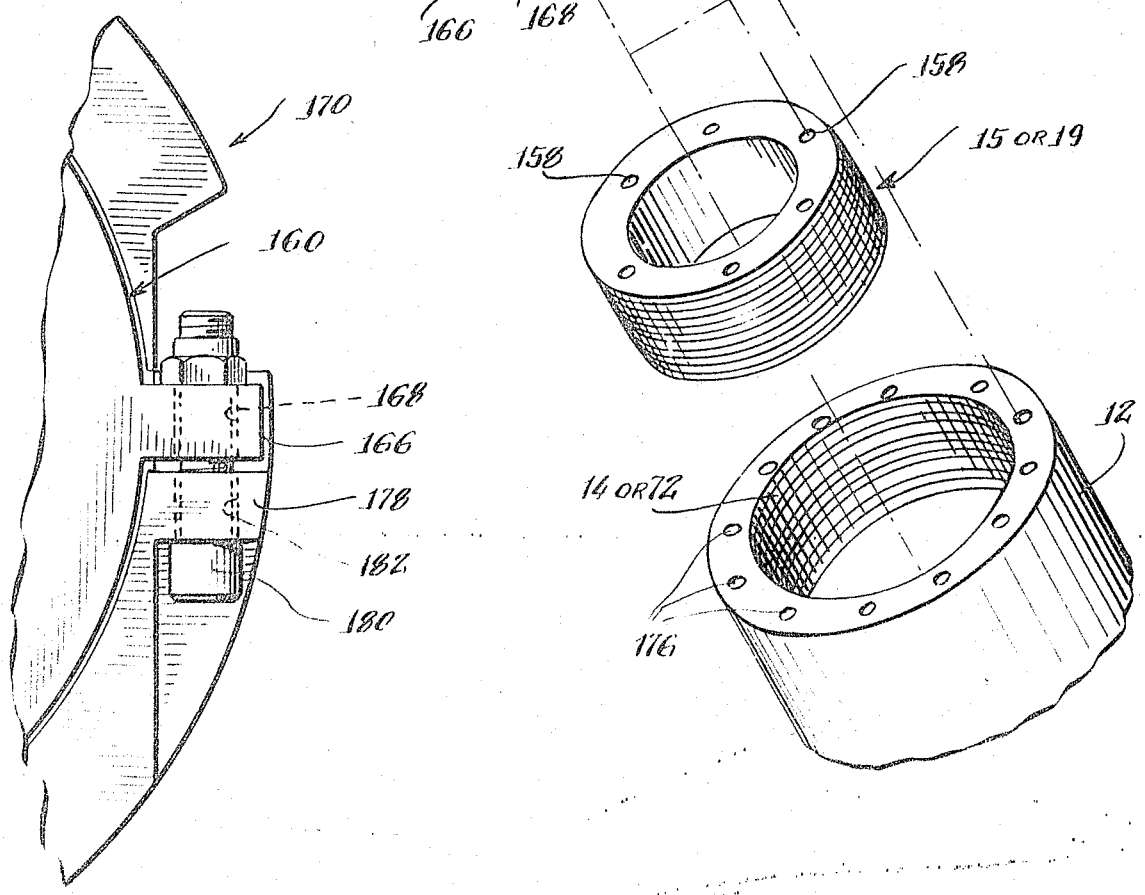
FIG. 5 is an enlarged axial end view of portions of the two tightening and locking rings for showing their cooperative action in final tightening and locking of the end closure.

A first tightening and locking ring 160 is then secured to the respective ring nut 15 or 19. This first tightening and locking ring 160 has a plurality of holes 162 through which a plurality of machine screws 164 (FIG. 1) are inserted and screwed into the sockets 158. This first ring 160 also has a plurality of radially extending lugs 166 with bolt holes 168 (Please see also FIG. 5) extending through them in the circumferential direction. There are three of these radial lugs shown in the tightening and locking ring 160.

After this first tightening and locking ring 160 is secured in place by the machine screws 164 (FIG. 1), a second tightening and locking ring 170 is secured to the end of the housing 12 by a plurality of machine screws 172 (FIG. 1) inserted through appropriately selected holes 174 in the second tightening and locking ring 170. The machine screws 172 are screwed into threaded sockets 176 in the end of the housing 12.

It is to be noted that there are a relatively large number of the holes 174 drilled in the second tightening and locking ring 170. The reason for providing so many holes 174 is to enable the mechanic to position the second tightening and locking ring 170 with respect to the first ring 160, so that its lug portions 178 are positioned relatively close to the lugs 166 of the already-installed ring 160. Then three bolts 180 are inserted through the circumferential holes 168 in the lugs 166 and through corresponding circumferential holes 182 in the lug portions 178. By tightening these bolts which extend in a circumferential direction, a tremendous mechanical advantage is obtained, thereby drawing the lugs 166 of the first ring 160 toward the anchored lug portions 178 of the second tightening and locking ring 170 for achieving a final forceful tightening of the ring nut 15 or 19.

In order to assure that the mechanic follows the proper procedure in assembling and tightening the ring nut 15 or 19, and in order to prevent inadvertent removal of the machine screws 164, the second tightening and locking ring 170 (which is generally positioned in encircling relationship around the first ring 160) has an annular skirt 184 extending radially inwardly and covering the heads of the machine screws 164. This skirt 184 has an inner diameter slightly smaller than the inner diameter of the first tightening and locking ring 160.

The manner in which the volume of the firing chamber 20 can be changed will be explained by reference to FIGS. 1 and 3. When it is desired to reduce the volume of the firing chamber, the effective length of the sleeve 22 is reduced by removing a portion 22', so that the bottom end cap 26 can be positioned higher in the housing 12. A spacer sleeve 186 seats between the ring nut 15 and the elevated end cap 16. It will be understood that by using different length sleeves 22A and corresponding lengths of spacer sleeves 186, the end cap 16 can be positioned at any desired level within the housing 12, as may be desired for providing any particular volume for the firing chamber 20.

An airgun as shown in FIG. 1 was fired at a depth of 30 feet below the surface of the Long Island Sound in water having an overall depth greater than 200 feet, with a hydrophone directly below the airgun at a depth of 75 feet; i.e., the hydrophone was 45 feet below the airgun. With a firing chamber volume of 2,000 cubic inches charged with compressed air at 4,000 p.s.i., a powerful impulse of at least 19 bar-meters was measured.

Figure 3:
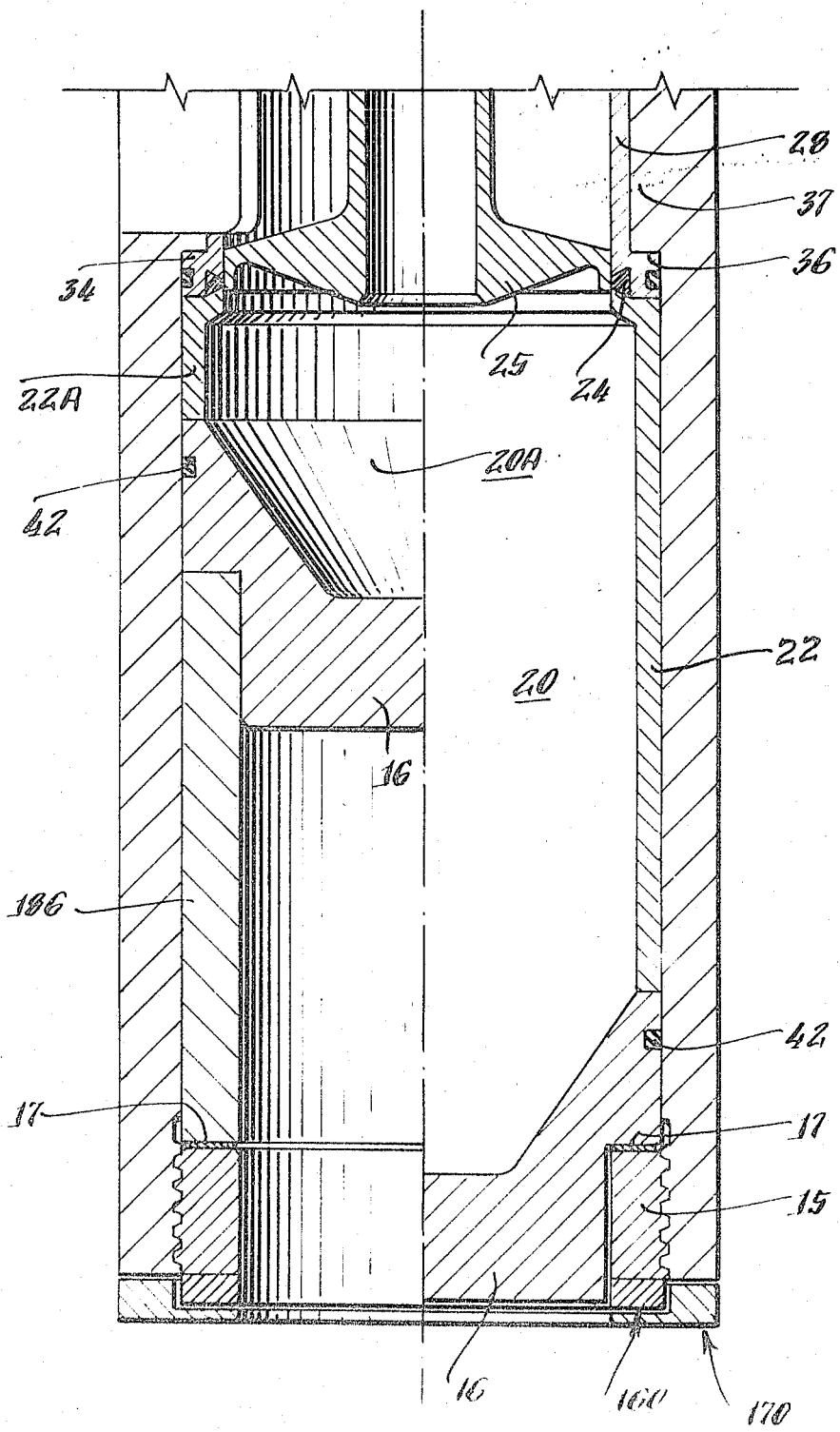
FIG. 3 is an axial sectional view of the lower end of the airgun illustrating how the firing chamber volume is changed.

In the lower position of the bottom closure 16, as shown in FIG. 3, the volume of the firing chamber 20 is 2,000 cubic inches. In the upper position of closure 16, the volume of the firing chamber 20A is 500 cubic inches. An extended cylindrical housing (not shown) can be secured into the threads 14 for increasing the volume of the firing chamber above 2,000 cubic inches, if desired.

It is to be understood that this airgun can be fired in any position, and therefore the terms "lower", "upper", "top", "bottom", "below", "above", etc. are used in the specification and claims for convenience of the reader in reference to the drawings as shown and are not intended to be interpreted as limiting on the scope of the invention.

I claim:

1. In an airgun impulsive energy source wherein gas pressure in an operating chamber is applied to the operating piston of a reciprocatable shuttle for holding the shuttle in an initial closed position for causing a firing piston of the shuttle to engage a firing seal to block access from a firing chamber to discharge port means for preventing pressurized gas in said firing chamber from escaping through said discharge port means and wherein the holding action of the gas pressure is released from the shuttle by actuating means for permitting the sudden movement of the shuttle to an open position in which said firing chamber suddenly communicates with the discharge port means for permitting pressurized gas in said firing chamber suddenly to escape through said discharge port means for generating a powerful impulse, the invention comprising:

an elongated cylindrical housing having at least one discharge port in the wall of the housing at a location intermediate the lower and upper ends of the housing and having an internal annular stop surface integral with the wall of said housing in predetermined axial position within the cylindrical housing above the discharge port and facing upwardly toward the upper end of the housing;

removable bottom closure means mountable in the lower end of said housing for closing the lower end of said housing for forming a firing chamber within the lower portion of said cylindrical housing;

removable partition means insertable down through the upper end of said cylindrical housing and having an external annular stop surface facing downwardly engageable with said internal annular stop surface for positioning said removable partition means above said discharge port in predetermined axially registered relationship with respect to the discharge port, said partition means having the shank of an axially reciprocatable shuttle extending axially therethrough with a firing piston below and an operating piston above said partition means;

an operating cylinder sleeve insertable down through the upper end of said cylindrical housing for resting on said removable partition means;

removable top closure means engageable with the upper end of said operating cylinder sleeve and mountable in the upper end of said housing for holding said sleeve firmly down against said removable partition means for holding said partition means firmly against said internal annular stop surface;

said removable top closure means and said operating cylinder sleeve defining an operating cylinder within which said operating piston can axially reciprocate;

said removable top closure means including passage means for feeding pressurized gas into said operating cylinder;

whereby said operating cylinder sleeve and said partition means can conveniently be removed from said housing by removing said top closure means; and said elongated cylindrical housing being an integral unit extending from said top closure means to said bottom closure means for providing high strength capability in said airgun of utilizing pressurized gas of a high pressure in the range from 4,000 to 6,000 p.s.i.

2. In an airgun impulsive energy source wherein gas pressure in an operating chamber is applied to the operating piston of a reciprocatable shuttle for holding the shuttle in an initial closed position for causing a firing piston of the shuttle to engage a firing seal to block access from a firing chamber to discharge port means for preventing pressurized gas in said firing chamber from escaping through said discharge port means and wherein the holding action of the gas pressure is released from the shuttle by actuating means for permitting the sudden movement of the shuttle to an open position in which said firing chamber suddenly communicates with the discharge port means for permitting pressurized gas in said firing chamber suddenly to escape through said discharge port means for generating a powerful impulse, the invention comprising:

an elongated cylindrical housing having at least one discharge port in the wall of the housing at a location intermediate the lower and upper ends of the housing and having an internal stop surface integral with the wall of said housing in predetermined position within the cylindrical housing above the discharge port and facing upwardly toward the upper end of the housing;

said upwardly facing internal stop surface being formed by the annular shoulder defined by the top of an internally protruding thickened wall portion integral with said cylindrical housing and extending axially along said housing for a distance greater than the axial length of said discharge port and beginning at a level above said discharge port and ending at a level below said discharge port for strengthening the wall of said elongated housing in the vicinity of said discharge port;

removable bottom closure means mountable in the lower end of said housing for closing the lower end of said housing for forming a firing chamber within the lower portion of said cylindrical housing;

removable partition means insertable down through the upper end of said cylindrical housing and having an external stop surface facing downwardly engageable with said internal stop surface for positioning said removable partition means above said discharge port in predetermined axially registered relationship with respect to the discharge port, said partition means having the shank of an axially reciprocatable shuttle extending axially therethrough with a firing piston below and an operating piston above said partition means;

an operating cylinder sleeve insertable down through the upper end of said cylindrical housing for resting on said removable partition means;

removable top closure means engageable with the upper end of said operating cylinder sleeve and mountable in the upper end of said housing for holding said sleeve firmly down against said removable partition means for holding said partition means firmly against said internal stop surface;

said removable top closure means and said operating cylinder sleeve defining an operating cylinder within which said operating piston can axially reciprocate;

said removable top closure means including passage means for feeding pressurized gas into said operating cylinder;

whereby said operating cylinder sleeve and said partition means can conveniently be removed from said housing by removing said top closure means; and said elongated cylindrical housing is an integral unit extending from said top closure means to said bottom closure means for providing high strength capability in said airgun of utilizing pressurized gas of a high pressure in the range from 4,000 to 6,000 p.s.i.

3. In an airgun impulsive energy source, the invention as claimed in claim 2, in which:

said internally protruding thickened wall portion of said cylindrical housing defines two internal stop surfaces facing upwardly and downwardly in predetermined respective positions within the cylindrical housing near the discharge port;

a release cylinder sleeve having an external flange on its lower end and being insertable up through said lower end of the cylindrical housing and being positionable within said housing with said external flange engaging said downwardly facing surface;

said release cylinder sleeve having at least one discharge port therein alignable with the respective discharge port in the housing and;

a firing chamber sleeve insertable up through said lower end of said housing and being positionable between said lower end of said release cylinder sleeve and said removable bottom closure means for holding said external flange firmly against said downwardly facing stop surface.

4. In an airgun impulsive energy source wherein gas pressure in an operating chamber is applied to the operating piston of a reciprocatable shuttle for holding the shuttle in an initial closed position for causing a firing piston of the shuttle to engage a firing seal to block access from a firing chamber to discharge ports for preventing pressurized gas in said firing chamber from escaping through said discharge ports, and wherein the holding action of the gas pressure is released from the shuttle by actuating means for permitting the sudden movement of the shuttle to an open position in which said firing chamber suddenly communicates with the discharge ports for permitting pressurized gas in said firing chamber suddenly to escape through said discharge ports for generating a powerful impulse, the invention comprising:

an elongated cylindrical housing having at least one discharge port in the wall of the housing at a location intermediate the lower and upper ends of the housing and having an internal stop surface in predetermined position within the cylindrical housing near the discharge port and facing upwardly toward the upper end of the housing;

removable bottom closure means for closing the lower end of said housing for forming a firing chamber within the lower portion of said cylindrical housing;

removable partition means insertable down through the upper end of said cylindrical housing and having an external stop surface facing downwardly engageable with said internal stop surface for positioning said removable partition means in predetermined registered relationship with respect to the discharge port, said partition means having the shank of an axially recriprocatable shuttle extending axially therethrough with a firing piston below and an operating piston above said partition means;

an operating cylinder sleeve insertable down through the upper end of said cylindrical housing for resting on said removable partition means;

removable top closure means engageable with said operating cylinder sleeve for holding it firmly down against said removable partition means for holding said partition means firmly against said internal stop surface;

said removable top closure means and said operating cylinder sleeve defining an operating cylinder within which said operating piston can axially reciprocate;

said removable top closure means including passage means for feeding pressurized gas into said operating cylinder;

said operating sleeve means having a firing passage extending axially through its wall;

said removable partition means having a firing passage therein communicating with the region between said operating piston and said partition means and adapted to communicate with said firing passage at the lower end of said sleeve means; and alignment means interengageable between said partition means and the lower end of said operating sleeve means for aligning said respective firing passages.

5. In an airgun impulsive energy source wherein gas pressure in an operating chamber is applied to the operating piston of a reciprocatable shuttle for holding the shuttle in an initial closed position for causing a firing piston of the shuttle to engage a firing seal to block access from a firing chamber to discharge ports for preventing pressurized gas in said firing chamber from escaping through said discharge ports, and wherein the holding action of the gas pressure is released from the shuttle by actuating means for permitting the sudden movement of the shuttle to an open position in which said firing chamber suddenly communicates with the discharge ports for permitting pressurized gas in said firing chamber suddenly to escape through said discharge ports for generating a powerful impulse, and also wherein the wall of the operating chamber has cut-out openings for enabling equalization of the gas pressure above and below the operating piston when the periphery of this piston is adjacent to said openings, the invention comprising:

an elongated cylindrical housing having at least one discharge port in the wall of the housing at a location intermediate the lower and upper ends of the housing and having an internal stop surface in predetermined position within the cylindrical housing near the discharge port and facing upwardly toward the upper end of the housing;

removable bottom closure means for closing the lower end of said housing for forming a firing chamber within the lower portion of said cylindrical housing;

removable partition means insertable down through the upper end of said cylindrical housing and having an external stop surface facing downwardly engageable with said internal stop surface for positioning said removable partition means in predetermined registered relationship with respect to the discharge port, said partition means having the shank of an axially recriprocatable shuttle extending axially therethrough with a firing piston below and an operating piston above said partition means;

an operating cylinder sleeve insertable down through the upper end of said cylindrical housing for resting on said removable partition means;

removable top closure means engageable with said operating cylinder sleeve for holding it firmly down against said removable partition means for holding said partition means firmly against said internal stop surface;

said removable top closure means and said operating cylinder sleeve defining an operating cylinder within which said operating piston can axially reciprocate;

said removable top closure means including passage means for feeding pressurized gas into said operating cylinder;

said operating cylinder sleeve forming said wall of the operating chamber and having said cut-out openings therein and having control passage means in said sleeve communicating between said cut-out openings and an upper region of said operating chamber for enabling gas flow to pass through said control passage means when the peripherey of the operating piston is above said cut-out openings for controlling the rebound action of the shuttle.

6. In an airgun impulsive energy source, the invention as claimed in claim 5, in which:

removable orifice means are operatively associated with said control passage means;

said orifice means having an orifice therein for restricting the flow through said control passage means; and said orifice means being changeable for adjusting the rebound control action on the shuttle.

7. In an airgun impulsive energy source wherein gas pressure in an operating chamber is applied to the operating piston of a reciprocatable shuttle for holding the shuttle in an initial closed position for causing a firing piston of the shuttle to engage a firing seal to block access from a firing chamber to discharge ports for preventing pressurized gas in said firing chamber from escaping through said discharge ports, and wherein the holding action of the gas pressure is released from the shuttle by actuating means for permitting the sudden movement of the shuttle to an open position in which said firing chamber suddenly communicates with the discharge ports for permitting pressurized gas in said firing chamber suddenly to escape through said discharge ports for generating a powerful impulse, the invention comprising:

an elongated cylindrical housing having at least one discharge port in the wall of the housing at a location intermediate the lower and upper ends of the housing and having an internal stop surface in predetermined position within the cylindrical housing near the discharge port and facing upwardly toward the upper end of the housing;

removable bottom closure means for closing the lower end of said housing for forming a firing chamber within the lower portion of said cylindrical housing;

removable partition means insertable down through the upper end of said cylindrical housing and having an external stop surface facing downwardly engageable with said internal stop surface for positioning said removable partition means in predetermined registered relationship with respect to the discharge port, said partition means having the shank of an axially reciprocatable shuttle extending axially therethrough with a firing piston below and an operating piston above said partition means;

an operating cylinder sleeve insertable down through the upper end of said cylindrical housing for resting on said removable partition means;

removable top closure means engageable with said operating cylinder sleeve for holding it firmly down against said removable partition means for holding said partition means firmly against said internal stop surface;

said removable top closure means and said operating cylinder sleeve defining an operating cylinder within which said operating piston can axially reciprocate;

said removable top closure means including passage means for feeding pressurized gas into said operating cylinder;

said internal stop surface being formed by an internally protruding thickened wall portion of said cylindrical housing extending axially along said housing for a distance greater than the axial length of said discharge port;

said internally protruding thickened wall portion of said cylindrical housing defining two internal stop surfaces, facing upwardly and downwardly respectively, in predetermined respective postions within the cylindrical housing near the discharge port;

a release cylinder sleeve having an external flange on its lower end and being insertable up through said lower end of the cylindrical housing and being positionable within said housing with said external flange engaging said downwardly facing surface;

said release cylinder sleeve having at least one discharge port therein alignable with the repective discharge port in the housing;

a firing chamber sleeve insertable up through said lower end of the cylindrical housing and being positionable between said lower end of said release cylinder sleeve and said removable bottom closure means for holding said external flange firmly against said downwardly facing stop surface; and a firing seal of tough stiffly flexible material captivated by the lower end of said release cylinder sleeve and the upper end of said firing chamber sleeve in predetermined stationary position for engagement by the periphery of said firing piston.

8. In an airgun impulsive energy source, the invention as claimed in claim 7, in which:
said positioning of said firing seal enables the mouth of said firing chamber to be effectively as large as the diameter of said firing piston.

9. In an airgun impulsive energy source, the invention as claimed in claim 7, in which:
the upper end of said firing chamber sleeve has passages therein for applying gas pressure from said firing chamber to the outer surface of said firing seal for pressing it inwardly against the periphery of the firing piston when said piston is in its closed position.

10. In an airgun impulsive energy source, the invention as claimed in claim 9, in which:
said firing seal has a trapezoidal shape as seen in cross section having an outer cylindrical surface larger in area than its inner cylindrical surface; and
said passages communicate with said outer cylindrical surface.

11. In an airgun implusive energy source, the invention as claimed in claim 10, in which:
said release cylinder sleeve has an inwardly extending and downwardly sloping lip surface at its lower end for captivating said trapezoidal-shaped firing seal; and
said firing chamber sleeve has an inwardly extending and upwardly sloping lip surface at its upper end for captivating said trapezoidal-shaped firing seal.

12. In an airgun impulsive energy source wherein gas pressure in an operating chamber is applied to the operating piston of a reciprocatable shuttle for holding the shuttle in an initial closed position for causing a firing piston of the shuttle to engage a firing seal to block access from a firing chamber to discharge ports for preventing pressurized gas in said firing chamber from escaping through said discharge ports, and wherein the holding action of the gas pressure is released from the shuttle by actuating means for permitting the sudden movement of the shuttle to an open position in which said firing chamber suddenly communicates with the discharge ports for permitting pressurized gas in said firing chamber suddenly to escape through said discharge ports for generating a powerful impulse, the invention comprising:

a peripheral firing seal of tough, durable, stiffly flexible material encircling the upper end of said firing chamber;

said peripheral firing seal having an internal diameter slightly smaller than the periphery of the firing piston for sealing engagement with the periphery of the firing piston when in its closed position;

holding means for captivating said firing seal in position for engagement by said periphery of the firing piston in its closed position;

whereby the mouth of the firing chamber becomes wide open when the shuttle moves to said open position for discharge of the pressurized gas from said firing chamber; and said holding means including passages for admitting gas pressure from the firing chamber to the radial outside surface of said firing seal for urging it radially inwardly into tight sealing engagement with the periphery of the firing piston in its closed position.

13. In an airgun impulsive energy source, the invention as claimed in claim 12, in which:
said firing seal is trapezoidal shape as seen in cross section having a cylindrical outer surface which is larger in area than the surface thereof engageable with the periphery of the firing piston.

14. In an airgun impulsive energy source wherein gas pressure in an operating chamber is applied to the operating piston of a reciprocatable shuttle for holding the shuttle in an initial closed position for causing a firing piston of the shuttle to engage a firing seal to block access from a firing chamber to discharge ports for preventing pressurized gas in said firing chamber from escaping through said discharge ports, and wherein the holding action of the gas pressure is released from the shuttle by actuating means for permitting the sudden movement of the shuttle to an open position in which said firing chamber suddenly communicates with the discharge ports for permitting pressurized gas in said firing chamber suddenly to escape through said discharge ports for generating a powerful impulse, the invention comprising:

an elongated cylindrical housing having at least one discharge port in the wall of the housing at a location intermediate the lower and upper ends of the housing and having an internal stop surface in predetermined position within the cylindrical housing near the discharge port and facing upwardly toward the upper end of the housing;

removable bottom closure means for closing the lower end of said housing for forming a firing chamber within the lower portion of said cylindrical housing;

removable partition means insertable down through the upper end of said cylindrical housing and having an external stop surface facing downwardly engageable with said internal stop surface for positioning said removable partition means in predetermined registered relationship with respect to the discharge port, said partition means having the shank of an axially reciprocatable shuttle extending axially therethrough with a firing piston below and an operating piston above said partition means;

said partition means including two members in axially stacked relationship with gland means held between them engaging the Shank of the shuttle;

axially extending bolts holding said members together as a pre-assembled sub-assembly;

an operating cylinder sleeve insertable down through the upper end of said cylindrical housing for resting on said removable partition means;

removable top closure means engageable with said operating cylinder sleeve for holding it firmly down against said removable partition means for holding said partition means firmly against said internal stop surface;

said removable top closure means and said operating cylinder sleeve defining an operating cylinder within which said operating piston can axially reciprocate; and said removable top closure means including passage means for feeding pressurized gas into said operating cylinder.

15. In an airgun impulsive energy source wherein gas pressure in an operating chamber is applied to the operating piston of a reciprocatable shuttle for holding the shuttle in an initial closed position for causing a firing piston of the shuttle to engage a firing seal to block access from a firing chamber to discharge port means for preventing pressurized gas in said firing chamber from escaping through said discharge port means and wherein the holding action of the gas pressure is released from the shuttle by actuating means for permitting the sudden movement of the shuttle to an open position in which said firing chamber suddenly communicates with the discharge port means for permitting pressurized gas in said firing chamber suddenly to escape through said discharge port means for generating a powerful impulse, the invention comprising:

an elongated cylindrical housing having at least one discharge port in the wall of the housing at a location intermediate the lower and upper ends of the housing and having an internal stop surface integral with the wall of said housing in predetermined position within the cylindrical housing above the discharge port and facing upwardly toward the upper end of the housing;

removable bottom closure means mountable in the lower end of said housing for closing the lower end of said housing for forming a firing chamber within the lower portion of said cylindrical housing;

removable partition means insertable down through the upper end of said cylindrical housing and having an external stop surface facing downwardly engageable with said internal stop surface for positioning said removable partition means above said discharge port in predetermined axially registered relationship with respect to the discharge port, said partition means having the shank of an axially reciprocatable shuttle extending axially therethrough with a firing piston below and an operating piston above said partition means;

an operating cylinder sleeve insertable down through the upper end of said cylindrical housing for resting on said removable partition means;

removable top closure means engageable with the upper end of said operating cylinder sleeve and mountable in the upper end of said housing for holding said sleeve firmly down against said removable partition means for holding said partition means firmly against said internal stop surface;

said removable top closure means and said operating cylinder sleeve defining an operating cylinder within which said operating piston can axially reciprocate;

said removable top closure means including passage means for feeding pressurized gas into said operating cylinder;

the upper and lower ends of said elongated cylindrical housing being internally threaded with screw-jack type of threads;

said top and bottom removable closure means being held in the respective ends of said housing by upper and lower nut members threaded into said threads;

upper and lower tightening and locking means respectively connected to said upper and lower nut members and detachably connected to the upper and lower ends of said housing for applying force in a predetermined circumferential direction at a plurality of points to the respective nut members for tightly screwing said nut members into said screw-jack type of threads and for locking said nut members in their tightened positions;

whereby said operating cylinder sleeve and said partition means can conveniently be removed from said housing by removing said top closure means; and said elongated cylindrical housing is an integral unit extending from said top closure means to said bottom closure means for providing high strength capability in said airgun of utilizing pressurized gas of a high pressure in the range from 4,000 to 6,000 p.s.i.

16. In an airgun impulsive energy source, the invention as claimed in claim 15, in which:

said upper and lower tightening means include a plurality of bolt holes therein each extending in a circumferential direction and a plurality of bolts extending through said bolt holes for applying force in said predetermined circumferential direction at said points.

17. In an airgun impulsive energy source wherein gas pressure in an operating chamber is applied to the operating piston of a reciprocatable shuttle for holding the shuttle in an initial closed position for causing a firing piston of the shuttle to engage a firing seal to block access from a firing chamber to at least one discharge port for preventing pressurized gas in said firing chamber from escaping through said discharge port, and wherein the holding action of the gas pressure is released from the shuttle by permitting the sudden movement of the shuttle to an open position in which said firing chamber suddenly communicates with the discharge port for permitting pressurized gas in said firing chamber suddenly to escape through said discharge port for generating a powerful impulse, the invention comprising:

a peripheral firing seal of tough, durable, stiffly flexible material mounted in the wall of said firing chamber and encircling the upper end of said firing chamber and defining the mouth of the firing chamber;

said peripheral firing seal having an internal diameter slightly smaller than the periphery of the firing piston for sealing engagement with the periphery of the firing piston when in its closed position; and holding means for captivating said firing seal in position protruding inwardly slightly from the wall of the firing chamber for engagement by said periphery of the firing piston in its closed position;

whereby the mouth of the firing chamber becomes wide open when the shuttle moves to said open position for discharge of the pressurized gas from said firing chamber.

18. In an airgun having a shuttle which is movable into a closed position for closing a firing chamber and which is suddenly movable into an open position for allowing pressurized gas to discharge suddenly from the firing chamber out through a discharge port, the invention comprising:

a firing seal of tough, durable, stiffly flexible material encircling said shuttle when in its closed position;

said firing seal being mounted in the wall of the firing chamber and having an inner surface protruding radially inwardly for engaging the periphery of the shuttle when the shuttle is in its closed position for sealing the firing chamber; and the wall of the firing chamber having passages for admitting pressurized gas from the firing chamber to the radial outside surface of said firing seal for urging the firing seal radially inwardly into tight sealing engagement with the periphery of the shuttle in its closed position.

19. In an airgun the invention as claimed in claim 18, in which:

said firing seal has a trapezoidal shape as seen in cross section with a surface facing radially outwardly which is larger in area than the surface of said firing seal which is engageable with the periphery of the firing piston.

20. In an airgun having a shuttle which is movable into a closed position for closing a firing chamber and which is suddenly movable into an open position for allowing pressurized gas to discharge suddenly from the firing chamber out through a discharge port, and wherein said shuttle includes an operating piston movable within an operating cylinder defined by a cylinder wall having openings therein for enabling the equalization of the gas pressure above and below said operating piston when the periphery of this piston moves adjacent to said openings, the invention comprising:

control passage means in the wall of said operating cylinder communicating between said openings and an upper region of said operating cylinder for enabling gas flow to pass through said control passage means when the periphery of the operating piston is above said openings for controlling the rebound action of the shuttle.

* * * * *